| United States Patent [19] | [11] | 4,328,143 |
|---|---|---|
| Izumi et al. | [45] | May 4, 1982 |

[54] AQUEOUS COATING COMPOSITION

[75] Inventors: Minao Izumi; Tamotsu Sobata; Shinichi Ishikura; Keizou Ishii, all of Osaka, Japan

[73] Assignee: Nippon Paint Company, Ltd., Osaka, Japan

[21] Appl. No.: 202,765

[22] Filed: Oct. 31, 1980

[30] Foreign Application Priority Data

Oct. 31, 1979 [JP] Japan ................................ 54-141746
Oct. 31, 1979 [JP] Japan ................................ 54-141747

[51] Int. Cl.³ ............................................ C08L 61/20
[52] U.S. Cl. .................. 523/412; 427/388.2; 427/388.3; 427/388.4; 524/512; 524/589; 524/598; 524/416
[58] Field of Search .................. 260/29.2 EP, 29.4 R, 260/29.6 RW, 29.4 UA, 29.6 Z, 29.6 SQ, 29.6 NR, 29.2 TN; 427/386, 388.1, 388.2, 388.3, 388.4

[56] References Cited

U.S. PATENT DOCUMENTS 3,937,679  2/1976  Bosso et al. ................. 260/29.2 EP
4,214,908  7/1980  Deguchi et al. ........ 260/29.6 SQ X
4,233,197  11/1980  Howell, Jr. .................. 427/388.3 X

*Primary Examiner*—Michael R. Lusignan
*Assistant Examiner*—Thurman K. Page
*Attorney, Agent, or Firm*—Wenderoth, Lind & Ponack

[57] ABSTRACT

An aqueous coating composition for formation of a coating film having high corrosion-resistance on a metal substrate which comprises (a) a film-forming polymeric material having at least one hydroxyl group and/or at least one carboxyl group, (b) a zwitter-ion compound and (c) an aminoplast resin and/or an epoxy resin with or without (d) a surface active agent having a hydrophilic functional group and at least one hydroxyl group and/or at least one carboxyl group.

7 Claims, No Drawings

AQUEOUS COATING COMPOSITION

The present invention relates to an aqueous coating composition for formation of a coating film having high corrosion-resistance on a metal substrate.

Aluminum and its alloys are widely utilized in the field of heat exchanger owing to their light weights as well as their excellent processability and thermal-conductivity. With spread of an air-conditioning system, the number of air-conditioners for cooling and heating is increased. In these air-conditioners, a fin of aluminum alloy is usually used in the heat-exchanging part. For manufacture of such heat-exchanging part of an air-conditioner, there is usually adopted a process (A) which comprises the steps of assembling of constituting elements of the heat-exchanger, brazing, testing of leakage, degreasing with a solvent, chemical treatment and drying. Recently, another process (B) has been proposed, in which an aluminum plate pre-coated with a resin is used as a fin material to omit the step of chemical treatment in the said procedure (A).

Aluminum and its alloys possess an excellent corrosion-resistance. But, when condensed water stays for a long time on the fin surface made thereof, a hydration reaction or a corrosive reaction is promoted due to formation of an oxygen concentration cell or adsorption of contaminating components in the air. The substance formed by corrosion accumulates on the fin surface to deteriorate the heat-exchanging ability, and on driving for heating in the wintertime, white fine powder is expelled out together with warm air by a blower. For overcoming these drawbacks, the aluminum plate pre-coated with a resin as the fin material is usually subjected to treatment for imparting corrosion-resistance thereto.

In the above mentioned process (B), the heat-exchanging part of the air-conditioner should be subjected, after completion of the steps of assembling, brazing and testing of leakage, to degreasing with a solvent such as trichloroethylene so as to eliminate press oil used on molding of the pre-coated aluminum plate or oil adhering to various constituting elements. But, in this degreasing step, dissolution of the resin film of the fin material takes place so that the solvent for degreasing is contaminated with the dissolved components of the resin film. Such dissolved components tend to adhere on the fin material to be degreased. Further, due to dissolution of the resin film, the fin material loses the corrosion-resistance.

On driving of an air-conditioner for cooling, moisture in the air adheres as condensed water to the surface of the fin material. The adhering condensed water remains in a bridge form between fins so that smooth flowing of the air is prevented and the air-flow resistance is increased, whereby the efficiency of heat-exchange is lowered.

For overcoming the above problems, an attempt has been made to form a coating film having high corrosion-resistance, preferably with good hydrophilic property, on the surface of a fin material. As a typical procedure for formation of such coating film, there is known a two-coating method in which a corrosion-resistant film is formed by chromate treatment and, on the obtained film, a hydrophilic film of silicate is further formed. For example, Japanese Patent Publication (unexamined) No. 38645/1975 discloses a two-coating method comprising the first treatment with a solution containing an alkali metal carbonate and an alkali metal chromate or bichromate and the second treatment with a solution containing an alkali metal silicate (e.g. $SiO_2$-$Na_2O$). The film obtained by this method is excellent both in hydrophilic property and in corrosion-resistance, but in an industrial continuous treatment on a large scale, an apparatus for treatment of waste water containing heavy metals such as chromium is necessitated, and besides, the treating equipment becomes larger in comparison with a one-coating method.

In the one-coating method wherein coating with a resin is effected, an excellent corrosion-resistance is usually obtained, but the coating film surface is water-repellent. For obtaining a hydrophilic property, incorporation of a surface active agent into the resin is suggested, but with lapse of time of contact with condensed water, the hydrophilic property of the film surface is gradually lost. It is also suggested to apply a composition comprising a polymeric material and a water-insoluble tetravalent metal dioxide (Japanese Patent Publication (unexamined) No. 125437/1978). Such application assures a good and durable hydrophilic property, but a high corrosion-resistance is hardly obtainable.

According to the present invention, there is provided an aqueous composition for formation of a coating film having a high corrosion-resistance on a metal surface, particularly an aluminum substrate, which comprises as the essential components (a) a film-forming organic material having at least one hydroxyl group and/or at least one carboxyl group, (b) a zwitter-ion compound and (c) an aminoplast resin and/or epoxy resin. When the said composition comprises additionally (d) a surface active agent having a hydrophilic functional group and at least one hydroxyl group and/or at least one carboxyl group, the coating film resulting therefrom is provided with a durable hydrophilic property in addition to a high corrosion-resistance.

The film-forming polymeric material (a) is a resin containing in the skeleton at least one of a hydroxyl group and a carboxyl group which is crosslinkable with an aminoplast resin or an epoxy resin. Usually, a water-soluble or water-dispersible one is employed. It is further desired that the film formed from the resin has an excellent corrosion-resistance. Specific examples of such resin are vinylic resins made of vinyl acetate, vinylidene chloride and/or vinyl chloride, acrylic resins made of acrylic esters, acrylic acid and/or methacrylic acid, aminoalkyd resins, epoxy resins, polyurethane resins, polyester resins, styrene resins, ethylenic polymers, natural and synthetic rubbers, natural high polymer resins, etc.

The zwitter-ion compound (b) may be used any conventional one, and particularly preferred is a hydroxyl group-containing aminosulfonic acid compound of the formula:

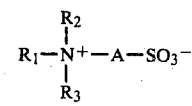

wherein $R_1$ is a $C_1$–$C_{20}$ alkyl group having at least one hydroxyl group, $R_2$ and $R_3$ are each a hydrogen atom or a $C_1$–$C_{20}$ alkyl group having optionally at least one hydroxyl group, or when linked together, they represent a $C_2$–$C_7$ alkylene group having optionally at least one hydroxyl group, or either one of $R_2$ and $R_3$ represents a $C_1$–$C_6$ straight or branched alkyl group having a sulfonic group or a substituted or unsubstituted phenyl group, and A is a straight or branched $C_1$–$C_6$ alkylene group or a substituted or unsubstituted phenylene group. Specific examples are as follows: N-(2-hydroxyethyl)aminomethanesulfonic acid and its N-alkyl and N,N-dialkyl derivatives (e.g. N-methyl-N-(2-hydroxyethyl)aminomethanesulfonic acid, N-ethyl-N-(2-hydroxyethyl)aminomethanesulfonic acid, N-isopropyl-N-(2-hydroxyethyl)aminomethanesulfonic acid, N-(2-ethylhexyl)-N-(2-hydroxyethyl)aminomethanesulfonic acid, N-decyl-N-(2-hydroxyethyl)aminomethanesulfonic acid, N-stearyl-N-(2-hydroxyethyl)aminomethanesulfonic acid, N,N-dimethyl-N-(2-hydroxyethyl)ammoniomethanesulfonic acid betaine, N,N-diethyl-N-(2-hydroxyethyl)ammoniomethanesulfonic acid betaine, N-methyl-N-dodecyl-N-(2-hydroxyethyl)ammoniomethanesulfonic acid betaine, etc.); N-(2-hydroxy-1-methylethyl)aminomethanesulfonic acid and its N-alkyl and N,N-dialkyl derivatives; N-(2-hydroxypropyl)aminomethanesulfonic acid and its N-alkyl and N,N-dialkyl derivatives; N-(2-propyl-2-hydroxyethyl)aminomethanesulfonic acid and its N-alkyl and N,N-dialkyl derivatives; N-(2-methyl-2-ethyl-2-hydroxyethyl)aminomethanesulfonic acid and its N-alkyl and N,N-dialkyl derivatives; N-(1,2-dimethyl-2-hydroxyethyl)aminomethanesulfonic acid and its N-alkyl and N,N-dialkyl derivatives; N-(1,1,2,2-tetramethyl-2-hydroxyethyl)aminomethanesulfonic acid and its N-alkyl and N,N-dialkyl derivatives; N-(1-methyl-5,5-dimethyl-5-hydroxypentyl)aminomethanesulfonic acid and its N-alkyl and N,N-dialkyl derivatives; N-(1,2-diisopropyl-2-hydroxyethyl)aminomethanesulfonic acid and its N-alkyl and N,N-dialkyl derivatives; N-(2,3-dihydroxypropyl)aminomethanesulfonic acid and its N-alkyl and N,N-dialkyl derivatives; N-(1-hydroxymethyl-2-hydroxyethyl)aminomethanesulfonic acid and its N-alkyl and N,N-dialkyl derivatives; N-(1-hydroxymethyl-2-methyl-2-hydroxyethyl)aminomethanesulfonic acid and its N-alkyl and N,N-dialkyl derivatives; N-(1-hydroxymethyl-3-hydroxypropyl)aminomethanesulfonic acid and its N-alkyl and N,N-dialkyl derivatives; N-[1-(γ-hydroxypropyl)-2-hydroxyethyl]aminomethanesulfonic acid and its N-alkyl and N,N-dialkyl derivatives; N-[1,1-bis(hydroxymethyl)-2-hydroxyethyl]aminomethanesulfonic acid and its N-alkyl and N,N-dialkyl derivatives; N-[2,2-bis(hydroxymethyl0-3-hydroxypropyl]aminomethanesulfonic acid and its N-alkyl and N,N-dialkyl derivatives; N,N-bis(2-hydroxyethyl)aminomethanesulfonic acid and its N-alkyl derivatives (e.g. N-methylN,N-bis(2-hydroxyethyl)ammoniomethanesulfonic acid betaine, N-ethyl-N,N-bis(2-hydroxyethyl)ammoniomethanesulfonic acid betaine, N-butyl-N,N-bis(2-hydroxyethyl)ammoniomethanesulfonic acid betaine, N-dodecyl-N,N-bis(2-hydroxyethyl)ammoniomethanesulfonic acid betaine, N-stearyl-N,N-bis(2-hydroxyethyl)ammoniomethanesulfonic acid betaine, etc.); N-(2-hydroxyethyl)-N-(2-hydroxypropyl)aminomethanesulfonic acid and its N-alkyl derivatives; N,N-bis(2-hydroxypropyl)aminomethanesulfonic acid and its N-alkyl derivative; N,N-bis(4-hydroxybutyl)aminomethanesulfonic acid and its N-alkyl derivative; N-(2-hydroxyethyl)-N-[1,1-bis(hydroxymethyl)-2-hydroxyethyl]aminomethanesulfonic acid and its N-alkyl derivative; N-(3-hydroxypropyl)-N-[1,1-bis(hydroxymethyl)-2-hydroxyethyl]aminomethanesulfonic acid and its N-alkyl derivative; N,N-bis(2,3-dihydroxypropyl)aminomethanesulfonic acid and its N-alkyl derivative; N,N-bis(1-hydroxymethyl)-2-hydroxyethylaminomethanesulfonic acid and its N-alkyl derivative; N,N-bis[1,1-bis(hydroxymethyl)-2-hydroxyethyl]aminomethanesulfonic acid and its N-alkyl derivative; N,N,N-tris(2-hydroxyethyl)ammoniomethanesulfonic acid betaine; N-(2-hydroxyethyl)aminoethanesulfonic acid and its N-alkyl and N,N-dialkyl derivatives (e.g. N-methyl-N-(2-hydroxyethyl)aminoethanesulfonic acid, N-ethyl-N-(2-hydroxyethyl)aminoethanesulfonic acid, N-isopropyl-N-(2-hydroxyethyl)aminoethanesulfonic acid, N-(2-ethylhexyl)-N-(2-hydroxyethyl)aminoethanesulfonic acid, N-decyl-N-(2-hydroxyethyl)aminoethanesulfonic acid, N-stearyl-N-(2-hydroxyethyl)aminoethanesulfonic acid, N,N-dimethyl-N-(2-hydroxyethyl)ammonioethanesulfonic acid betaine, N,N-diethyl-N-(2-hydroxyethyl)ammonioethanesulfonic acid betaine, N-methyl-N-dodecyl-N-(2-hydroxyethyl)ammonioethanesulfonic acid betaine, etc.); N-(2-hydroxy-1-methylethyl)aminoethanesulfonic acid and its N-alkyl and N,N-dialkyl derivatives; N-(2-hydroxypropyl)aminoethanesulfonic acid and its N-alkyl and N,N-dialkyl derivative; N-(3-hydroxypropyl)aminoethanesulfonic acid and its N-alkyl and N,N-dialkyl derivatives; N-(2-propyl-2-hydroxyethyl)aminoethanesulfonic acid and its N-alkyl and N,N-dialkyl derivatives; N-(2-methyl-2-ethyl-2-hydroxyethyl)aminoethanesulfonic acid and its N-alkyl and N,N-dialkyl derivatives; N-(1,2-dimethyl-2-hydroxyethyl)aminoethanesulfonic acid and its N-alkyl and N,N-dialkyl derivatives; N-(1,1,2,2-tetramethyl-2-hydroxyethyl)aminoethanesulfonic acid and its N-alkyl and N,N-dialkyl derivatives; N-(1-methyl-5,5-dimethyl-5-hydroxypentyl)aminoethanesulfonic acid and its N-alkyl and N,N-dialkyl derivatives; N-(1,2-diisopropyl-2-hydroxyethyl)aminoethanesulfonic acid and its N-alkyl and N,N-dialkyl derivatives; N-(2,3-dihydroxypropyl)aminoethanesulfonic acid and its N-alkyl and N,N-dialkyl derivatives; N-(1-hydroxymethyl-2-hydroxyethyl)aminoethanesulfonic acid and its N-alkyl and N,N-dialkyl derivatives; N-(1-hydroxymethyl-2-methyl-2-hydroxyethyl)aminoethanesulfonic acid and its N-alkyl and N,N-dialkyl derivatives; N-(1-hydroxymethyl-3-hydroxypropyl)aminoethanesulfonic acid and its N-alkyl and N,N-dialkyl derivatives; N-[1-(γ-hydroxypropyl)-2-hydroxyethyl]aminoetanesulfonic acid and its N-alkyl and N,N-dialkyl derivatives; N-[1,1-bis(hydroxymethyl)-2-hydroxyethyl]aminoethanesulfonic acid and its N-alkyl and N,N-dialkyl derivatives; N-[2,2-bis(hydroxymethyl)-3-hydroxypropyl]aminoethanesulfonic acid and its N-alkyl and N,N-dialkyl derivatives; N,N-bis(2-hydroxyethyl)aminoethanesulfonic acid and its N-alkyl derivatives (e.g. N-methyl-N,N-bis(2-hydroxyethyl)ammonioethanesulfonic acid betaine, N-ethyl-N,N-bis(2-hydroxyethyl)ammonioethanesulfonic acid betaine, N-butyl-N,N-bis(2-hydroxyethyl)ammonioethanesulfonic acid betaine, N-dodecyl-N,N-bis(2-hydroxyethyl)ammonioethanesulfonic acid betaine, N-stearyl-N,N-bis(2-hydroxyethyl)ammonioethanesulfonic acid betaine, etc.); N-(2-hydroxyethyl)-N-(2-hydroxypropyl)aminoethanesulfonic acid and its N-alkyl derivatives; N,N-bis(2-hydroxypropyl)aminoethanesulfonic acid and its N-alkyl derivatives; N,N-bis(4-hydroxybutyl)aminoethanesulfonic acid and its N-alkyl derivatives; N-(2-hydroxyethyl)-N-[1,1-bis-(hydroxymethyl)-2-hydroxyethyl]aminoethanesulfonic acid and its N-alkyl derivatives; N-(3-hydroxypropyl)-N-[1,1-bis(hydroxymethyl)-2-hydroxyethyl]aminoethanesulfonic acid and its N-alkyl derivatives; N,N-bis(2,3-dihydroxypropyl)aminoethanesulfonic acid and its N-alkyl derivatives; N,N-bis[1-(hydroxy9 methyl)-2-hydroxyethyl]aminoethanesulfonic acid and its N-alkyl derivatives; N,N-bis[1,1-bis(hydroxymethyl)-2-hydroxyethyl]aminoethanesulfonic acid and its N-alkyl derivatives; N,N,N-tris(2-hydroxyethyl)ammonioethanesulfonic acid betain; N,N-bis(2-hydroxyethyl)-N-(3-hydroxypropyl)ammonioethanesulfonic acid betaine; N,N,N-tris(3-hydroxypropyl)ammonioethanesulfonic acid betaine; 3-[N-(2-hydroxyethyl)]aminopropanesulfonic acid-(1) and its N-alkyl and N,N-dialkyl derivatives (e.g. 3-[N-methyl-N-(2-hydroxyethyl)]aminopropanesulfonic acid-(1), 3-[N-ethyl-N-(2-hydroxyethyl)]-aminopropanesulfonic acid-(1), 3-[N-isopropyl-N-(2-hydroxyethyl)]aminopropanesulfonic acid-(1), 3-[N-(2-ethylhexyl)-N-(2-hydroxyethyl)]aminopropanesulfonic acid-(1), 3-[N-decyl-N-(2-hydroxyethyl)]aminopropanesulfonic acid-(1), 3-[N-stearyl-N-(2-hydroxyethyl)-]aminopropanesulfonic acid-(1), 3-[N,N-dimethyl-N-(2-hydroxyethyl)]ammoniopropanesulfonic acid-(1) betaine, 3-[N,N-diethyl-N-(2-hydroxyethyl)]ammoniopropanesulfonic acid-(1) betaine, 3-[N-methyl-N-dodecyl-N-(2-hydroxyethyl)]ammoniopropanesulfonic acid-(1) betaine, etc.); 3-[N-(2-hydroxy-1-methylethyl)]aminopropanesulfonic acid-(1) and its N-alkyl and N,N-dialkyl derivatives; 3-[N-(2-hydroxypropyl)]aminopropanesulfonic acid-(1) and its N-alkyl and N,N-dialkyl derivatives; 3-[N-(3-hydroxypropyl)]aminopropanesulfonic acid-(1) and its N-alkyl and N,N-dialkyl derivatives; 3-[N-(2-propyl-2-hydroxyethyl)]aminopropanesulfonic acid-(1) and its N-alkyl and N,N-dialkyl derivatives; 3-[N-(2-ethyl-2-ethyl-2-hydroxyethyl)]aminopropanesulfonic acid-(1) and its N-alkyl and N,N-dialkyl derivatives; 3-[N-(1,2-dimethyl-2-hydroxyethyl)]aminopropanesulfonic acid-(1) and its N-alkyl and N,N-dialkyl derivatives; 3-[N-(1,1,2,2-tetramethyl-2-hydroxyethyl)]aminopropanesulfonic acid-(1) and its N-alkyl and N,N-dialkyl derivatives; 3-[N-(1-methyl-5,5-dimethyl-5-hydroxypentyl)]aminopropanesulfonic acid-(1) and its N-alkyl and N,N-dialkyl derivatives; 3-[N-(1,2-diisopropyl-2-hydroxyethyl)]aminopropanesulfonic acid-(1) and its N-alkyl and N,N-dialkyl derivatives; 3-[N-(2,3-dihydroxypropyl)]aminopropanesulfonic acid-(1) and its N-alkyl and N,N-dialkyl derivatives; 3-[N-(1-hydroxymethyl-2-hydroxyethyl)]aminopropanesulfonic acid-(1) and its N-alkyl and N,N-dialkyl derivatives; 3-[N-(1-hydroxymethyl-2-methyl-2-hydroxyethyl)]aminopropanesulfonic acid-(1) and its N-alkyl and N,N-dialkyl derivatives; 3-[N-(1-hydroxymethyl-3-hydroxypropyl)-]aminopropanesulfonic acid-(1) and its N-alkyl and N,N-dialkyl derivatives; 3-[N-(1-(γ-hydroxypropyl)-2-hydroxyethyl)]aminopropanesulfonic acid-(1) and its N-alkyl and N,N-dialkyl derivatives; 3-[N-(1,1-bis(hydroxymethyl)-2-hydroxyethyl)]aminopropanesulfonic acid-(1) and its N-alkyl and N,N-dialkyl derivatives; 3-[N-(2,2-bis(hydroxymethyl)-3-hydroxypropyl)-]aminopropanesulfonic acid-(1) and its N-alkyl and N,N-dialkyl derivatives; 3-[N,N-bis(2-hydroxyethyl)-]aminopropanesulfonic acid-(1) and its N-alkyl derivatives (e.g. 3-[N-methyl-N,N-bis(2-hydroxyethyl)]ammoniopropanesulfonic acid-(1) betaine, 3-[N-ethyl-N,N-bis(2-hydroxyethyl)]ammoniopropanesulfonic acid-(1) betaine, 3-[N-butyl-N,N-bis(2-hydroxyethyl)]ammoniopropanesulfonic acid-(1) betaine, 3-[N-dodecyl-N,N-bis(2-hydroxyethyl)]ammoniopropanesulfonic acid-(1) betaine, 3-[N-stearyl-N,N-bis(2-hydroxyethyl)]ammoniopropanesulfonic acid-(1) betaine, etc.); 3-[N-(2-hydroxyethyl)-N-(2-hydroxypropyl)]aminopropanesulfonic acid-(1) and its N-alkyl derivatives; 3-[N,N-bis(2-hydroxypropyl)]aminopropanesulfonic acid-(1) and its N-alkyl derivatives; 3-[N,N-bis(4-hydroxybutyl)]aminopropanesulfonic acid-(1) and its N-alkyl derivatives; 3-[N-(2-hydroxyethyl)-N-(1,1-bis(hydroxymethyl)-2-hydroxyethyl)]aminopropanesulfonic acid-(1) and its N-alkyl derivatives; 3-[N-(3-hydroxypropyl)N-(1,1-bis(-hydroxymethyl)-2-hydroxyethyl)]aminopropanesulfonic acid-(1) and its N-alkyl derivatives; 3-[N,N-bis(2,3-dihydroxypropyl)]aminopropanesulfonic acid-(1) and its N-alkyl derivatives; 3-[N,N-bis(1-(hydroxymethyl)-2-hydroxyethyl)]aminopropanesulfonic acid-(1) and its N-alkyl derivatives; 3-[N,N-bis(1,1-(bishydroxymethyl)-2-hydroxyethyl)]aminopropanesulfonic acid and its N-alkyl derivatives; 3-[N,N,N-tris(2-hydroxyethyl)]ammoniopropanesulfonic acid-(1) betaine; 3-[N,N-bis(2-hydroxyethyl)-N-(3-hydroxypropyl)-]ammoniopropanesulfonic acid-(1) betaine; 3-[N,N,N-tris(3-hydroxypropyl)]-ammoniopropanesulfonic acid-(1) betaine; 5-[N-(2-hydroxyethyl)]aminopentanesulfonic acid-(1) and its N-alkyl and N,N-dialkyl derivatives (e.g. 5-[N-methyl-N-(2-hydroxyethyl)]aminopentanesulfonic acid-(1), 5-[N-ethyl-N-(2-hydroxyethyl)-]aminopentanesulfonic acid-(1), 5-[N-isopropyl-N-(2-hydroxyethyl)]aminopentanesulfonic acid-(1), 5-[N-(2-ethylhexyl)-N-(2-hydroxyethyl)]aminopentanesulfonic acid-(1), 5-[N-decyl-N-(2-hydroxyethyl)]aminopentanesulfonic acid-(1), 5-[N-stearyl-N-(2-hydroxyethyl)-]aminopentanesulfonic acid-(1), 5-[N,N-dimethyl-N-(2-hydroxyethyl)]ammoniopentanesulfonic acid-(1) betaine, 5-[N,N-diethyl-N-(2-hydroxyethyl)]ammoniopentanesulfonic acid-(1) betaine, 5-[N-methyl-N-dodecyl-N-(2-hydroxyethyl)]ammoniopentanesulfonic acid-(1) betaine, etc.); 5-[N,N-bis(2-hydroxyethyl)]aminopentane-sulfonic acid-(1) and its N-alkyl (e.g. 5-[N-methyl-N,N-bis(2-hydroxyethyl)]ammoniopentanesulfonic acid-(1) betaine, 5-[N-ethyl-N,N-bis(2-hydroxyethyl)-]ammoniopentanesulfonic acid-(1) betaine, 5-[N-butyl-N,N-bis(2-hydroxyethyl)]ammoniopentanesulfonic acid-(1) betaine, 5-[N-dodecyl-N,N-bis(2-hydroxyethyl)]ammoniopentanesulfonic acid-(1) betaine, 5-[N-stearyl-N,N-bis(2-hydroxyethyl)ammoniopentanesulfonic acid-(1) betaine, etc.); 5-[N,N,N-tris(2-hydroxyethyl)]ammoniopentanesulfonic acid-(1) betaine; N-(2-hydroxyethyl)iminodiethanesulfonic acid; N-(2-hydroxypropyl)iminodiethanesulfonic acid; N-(2,3-dihydroxypropyl)iminodiethanesulfonic acid; N-(1,1-bis(hydroxymethyl)-2-hydroxyethyl)iminodiethanesulfonic acid; N-(2-hydroxyethyl)iminoethanesulfonic acid propanesulfonic acid; N-(2-hydroxypropyl)iminoethanesulfonic acid propanesulfonic acid; N-(2,3-dihydroxypropyl)iminoethanesulfonic acid propanesulfonic acid; N-(1,1-bis(hydroxymethyl)-2-hydroxyethyl)iminoethanesulfonic acid propanesulfonic acid; N-(2-hydroxyethyl)orthanilic acid; N-(2-hydroxyethyl)orthanilic acid; N-(2-hydroxyethyl)sulfanilic acid; N,N-bis(2-hydroxyethyl)arthanilic acid; N,N-bis(2-hydroxyethyl)methanilic acid; N,N-bis(2-hydroxyethyl)sulfanilic acid, etc. These compounds may be used solely or in combination. Further, they may be used as such or in the form of aqueous solutions, for instance, adjusted to pH 8 to 10 with aqueous ammonia or organic amines.

The zwitter-ion compound (b) contains a hydrophilic group such as a hydroxyl group, an amino group or a sulfonic acid group and thus can impart a hydrophilic property to the resulting film. In the film-forming step, it moves to and is concentrated on the surface layer of the film with evaporation of water. Thus, the formed film may be composed of the hydrophilic surface layer containing the zwitter-ion compound (b) and the lower layer comprising the resin alone.

The role of the zwitter-ion compound (b) may be considered to be as follows:

(1) Serving as an acid catalyst in the crosslinking reaction between the film-forming polymeric material (a) and the aminoplast resin and/or the epoxy resin (d) to afford a fine, corrosion-resistant film; and (2) Causing fixation of the surface active agent having a least one of a hydroxy group and a carboxyl group to the film-forming polymeric material (a) in the presence of the aminoplast resin and/or epoxy resin (d) as a medium to improve the hydrophilic property and to keep the hydrophilic property for a long time.

The amount of the zwitter-ion compound (b) is usually 0.05% (by weight) or more, preferably from 0.1 to 10%, to the weight of the film-forming polymeric material (a). When the amount is less than 0.5%, a sufficient solvent-resistance or a durable hydrophilic property is not obtained. When the amount is larger than 10%, further improvement of the effect is not expected, and with a largely excessive amount, the close-adherence of the film onto the substrate and the storage-stability of the composition are lowered.

The aminoplast resin as the component (c) may be any conventional one such as a melamine resin, an urea resin or a guanamine resin. These resins may be used, solely or in combination, as such or in the form of solution in water or a suitable hydrophilic organic solvent. In place of or in addition to the aminoplast resin, any conventional epoxy resin may be employed as the component (c). The amount of the component (c) is usually from 0.5 to 60%, preferably from 5 to 50%, to the weight of the film-forming polymeric material (a). When the amount is less than 0.5%, the hardening reaction of the film-forming polymeric material (c) and the fixation of the surface active agent (d) to the film-forming polymeric material (a) do not progress sufficiently so that a high corrosion-resistance and a durable hydrophilic property can not be obtained. When the amount is larger than 60%, the storage-stability of the composition is greatly lowered.

As the surface active agent (d), there may be used any one of nonionic, anionic, cationic and amphoionic surface active agents which have at least one of a hydroxyl group and a carboxyl group in addition to a hydrophilic functional group. Examples of such nonionic surface active agents are fatty acid esters of polyvalent alcohols such as sorbitan alkyl ester, adducts of ethylene oxide polymers such as polyoxyethylene alkyl ethers, polyoxyethylene alkyl phenol ethers, polyoxyethylene sorbitan alkyl esters and polyoxyethylene ethers of polyoxypropylenes and alkylolamide compounds. Examples of such cationic surface active agents are primary amines, secondary amines, tertiary amines and quaternary amines. Examples of such amphoionic surface active agents are carboxylic acid compounds. These agents may be used solely or in combination.

The surface active agent as the component (d) is fixed to the film-forming polymeric material (a) by the action of the zwitter-ion compound (b) and the aminoplast resin and/or the epoxy resin (c) to give a durable hydrophilic property to the formed film. The amount of the surface active agent is usually 80–90% or less, preferably from 10 to 60%, to the weight of the film-forming polymeric material (a). With an amount larger than 80–90%, a further improvement of the effect is not expected, but the storage-stability of the composition is rather lowered. With an amount less than 10%, a sufficient hydrophilic property is not obtained.

The aqueous composition of the invention may be prepared by mixation of the essential components (a) to (c) with or without the optional component (d) in a designed mixing ratio. If necessary, conventional additives such as coloring agents, wettability-improving agents and viscosity-regulating agents may be incorporated therein. The concentration of the film-forming polymeric material (a) in the aqueous composition may be so designed that a coating film with an enough amount for giving a sufficient corrosion-resistance to the surface of a metal substrate can be formed. Such amount may be, for instance, 0.5–1.0 g/m$^2$ or more.

The aqueous composition of the invention may be applied to the surface of a metal substrate at a temperature of 5° to 60° C. by a conventional procedure (e.g. immersion, spraying, roll-coat), followed by drying at 80° to 300° C. for 0.3 to 20 minutes.

The present invention will be hereinafter explained further in detail by the following Examples and Comparative Examples, wherein part(s) and % are by weight. The physical properties were evaluated as follows:

(1) Corrosion-resistance

According to JIS (Japanese Industrial Standard) Z-2371, the salt spray test was effected with a spraying time of 500 hours. Evaluation was made with the percentage of the whitely corroded area to the whole area on the following criteria:

⊚ : Percentage of whitely corroded area being 0%
O: Percentage of whitely corroded area being 0 to 10%
Δ: Percentage of whitely corroded area being 11 to 80%
X: Percentage of whitely corroded area being 81% or more (2) Solvent-resistance The plate was immersed in trichloroethylene at 70° C. for 3 minutes. The film decreasing percentage was calculated according to the following equation:

$$\text{Film decreasing percentage} = \frac{\text{Decreased weight of film}}{\text{Film weight}} \times 100\ (\%)$$

Film decreasing percentage = Decreased weight of film/Film weight × 100 (%)
and evaluation was made on the following criteria:
O: Film decreasing percentage being 0 to 20%
Δ: Film decreasing percentage being 21 to 30%
X: Film decreasing percentage being 31% or more (3) Initial hydrophilic property Evaluation was made with the contact angle determined by the aid of a contact angle-measuring apparatus of goniometer type 5 to 10 seconds after dropping of pure water (2 μl) on the following criteria:

⊚ : Contact angle of 20° or less
O: Contact angle of 21° to 40°
Δ: Contact angle of 41° to 60°
X: Contact angle of 61° or more (4) Maintenance of hydrophilic property Evaluation was made with the spraying time until which the hydrophilic property was kept at a contact angle of 60° or less under the promoting conditions in the salt spray test according to JIS Z-2371 on the following criteria:
O: 70 hours or more
Δ: 24 to 69 hours
X: 23 hours or less

EXAMPLES 1 TO 11 AND COMPARATIVE

Z-C: 10% Aqueous solution of N-[1,1-bis(hydroxymethyl)-2-hydroxyethyl]aminomethanesulfonic acid Aminoplast resin Cy-370: Melamine resin("Cymel 370" manufactured by Mitsui Toatsu Chemicals, Inc.)
U-L: Urea resin ("Urecoal-L" manufactured by BASF).

TABLE 1

| Aqueous composition | Film-forming polymeric material | | | Zwitter-ion compound | | | Aminoplast resin | | Water | Corrosion resistance | Solvent resistance |
|---|---|---|---|---|---|---|---|---|---|---|---|
| | A | B | C | Z-A | Z-B | Z-C | Cy-370 | U-L | | | |
| Example 1 | 500 | — | — | 17 | — | — | 10 | — | 473 | ◎ | O |
| Example 2 | — | 500 | — | 17 | — | — | 10 | — | 473 | ◎ | O |
| Example 3 | — | — | 500 | 17 | — | — | 10 | — | 473 | ◎ | O |
| Example 4 | — | — | 500 | 140 | — | — | 10 | — | 350 | ◎ | O |
| Example 5 | — | — | 700 | 26 | — | — | 15 | — | 259 | ◎ | O |
| Example 6 | — | — | 500 | — | 17 | — | 10 | — | 473 | ◎ | O |
| Example 7 | — | — | 500 | — | — | 17 | 10 | — | 473 | ◎ | O |
| Example 8 | — | — | 500 | 34 | — | — | 10 | — | 456 | ◎ | O |
| Example 9 | — | — | 500 | 17 | — | — | — | 10 | 473 | ◎ | O |
| Example 10 | — | — | 500 | 17 | — | — | 60 | — | 423 | ◎ | O |
| Example 11 | — | — | 500 | 34 | — | — | 60 | — | 406 | ◎ | O |
| Comparative Example 1 | — | — | 500 | — | — | — | — | — | 500 | ◎ | Δ |
| Comparative Example 2 | — | — | 500 | — | — | — | 10 | — | 490 | ◎ | X |
| Comparative Example 3 | — | — | 500 | 17 | — | — | — | — | 483 | ◎ | Δ |

EXAMPLES 1 TO 3

An aluminum plate (1S) was degreased with a weak alkaline degreasing agent ("Ridoline 75" manufactured by Nippon Paint Co., Ltd.) and washed with water. The thus treated plate was immersed into an aqueous composition comprising the components shown in Table 1 at room temperature for 30 seconds, and setting was effected for 5 minutes. Then, the plate was placed in a drying furnace at 160° C. for 20 minutes for drying under heating (film weight, 2 g/m$^2$). The physical properties of the coated film as evaluated are shown in Table 1.

The preparation of the aqueous composition was effected by adding to water the film-forming polymeric material, the zwitter-ion compound and the aminoplast resin, followed by stirring to make a uniform composition. The zwitter-ion compound was used in the form of an aqueous solution adjusted to pH 8 to 9.5 with aqueous ammonia.

Each component shown in Table 1 is specified below:

Film-forming polymeric material

A: Aqueous emulsion of thermosetting acrylic resin (molecular weight, about 100,000; solid content, 30%)
B: Aqueous emulsion of thermosetting amino alkyd resin (solid content, 30%)
C: Aqueous emulsion of carboxyl-modified polyolefin (molecular weight, about 100,000; content of acrylic acid, 15%; solid content, 30%)

Zwitter-ion compound

Z-A: 10% Aqueous solution of N-bis(2-hydroxyethyl)aminoethanesulfonic acid
Z-B: 10% Aqueous solution of N-(2-hydroxyethyl)iminodiethanesulfonic acid

EXAMPLES 12 TO 25 AND COMPARATIVE EXAMPLES 4 TO 6

An aluminum plate (1S) pre-treated as in Examples 1 to 11 was immersed in an aqueous composition comprising the components shown in Table 2 at room temperature for 30 seconds, and setting was effected for 5 minutes. Then, the plate was placed in a drying furnace at 160° C. for 20 minutes for drying under heating (film weight, 2 g/m$^2$). The physical properties of the coated film as evaluated are shown in Table 2.

The preparation of the aqueous composition was effected by adding to water the film-forming polymeric material, the zwitter-ion compound, the aminoplast resin and the surface active agent, followed by stirring to make a uniform composition. The zwitter-ion compound was used in the form of an aqueous solution adjusted to pH 8 to 9.5 with aqueous ammonia.

Each component shown in Table 2 is specified below:

Film-forming polymeric material

A to C: As defined in Examples 1 to 11

Zwitter-ion compound

Z-A to Z-C: As defined in Examples 1 to 11.

Aminoplast resin

CY-370 and U-L: As defined in Examples 1 to 11.

Surface active agent

S-A: Sorbitan monooleate (nonionic)
S-B: Polyoxyethylene sorbitan monooleate (nonionic; number of moles of added ethylene oxide, 20–22)
S-C: Bis(2-hydroxyethyl)aliphatic amine (cationic; the straight chain of carbons derived from fatty acids of beef tallow)

TABLE 2

| Aqueous composition | Film-forming polymeric material | | | Zwitter-ion compound | | | Aminoplast resin | | Surface active agent | | | Water | Corrosion resistance | Initial hydrophilic property | Maintenance of hydrophilic property |
|---|---|---|---|---|---|---|---|---|---|---|---|---|---|---|---|
| | A | B | C | Z-A | Z-B | Z-C | Cy-370 | U-L | S-A | S-B | S-C | | | | |
| Example 12 | 394 | — | — | 100 | — | — | 10 | — | 13 | 14 | — | 496 | ◉ | ◉ | O |
| Example 13 | — | 394 | — | 100 | — | — | 10 | — | 13 | 14 | — | 469 | ◉ | ◉ | O |
| Example 14 | — | — | 394 | 100 | — | — | 10 | — | 13 | 14 | — | 469 | ◉ | ◉ | O |
| Example 15 | — | — | 591 | 150 | — | — | 15 | — | 19 | 21 | — | 204 | ◉ | ◉ | O |
| Example 16 | — | — | 394 | 30 | — | — | 10 | — | 13 | 14 | — | 539 | ◉ | ◉ | O |
| Example 17 | — | — | 394 | — | 100 | — | 10 | — | 13 | 14 | — | 469 | ◉ | ◉ | O |
| Example 18 | — | — | 394 | — | — | 100 | 10 | — | 13 | 14 | — | 469 | ◉ | ◉ | O |
| Example 19 | — | — | 394 | 200 | — | — | 10 | — | 13 | 14 | — | 369 | ◉ | ◉ | O |
| Example 20 | — | — | 394 | 100 | — | — | — | 10 | 13 | 14 | — | 469 | ◉ | ◉ | O |
| Example 21 | — | — | 394 | 100 | — | — | 60 | — | 13 | 14 | — | 459 | ◉ | ◉ | O |
| Example 22 | — | — | 394 | 200 | — | — | 60 | — | 13 | 14 | — | 359 | ◉ | ◉ | O |
| Example 23 | — | — | 394 | 100 | — | — | 10 | — | — | 14 | 13 | 469 | ◉ | ◉ | O |
| Example 24 | — | — | 394 | 100 | — | — | 10 | — | 26 | 28 | 13 | 429 | ◉ | ◉ | O |
| Example 25 | — | — | 394 | 100 | — | — | 10 | — | 39 | 42 | — | 415 | ◉ | ◉ | O |
| Comparative Example 4 | — | — | 394 | — | — | — | 10 | — | 13 | 14 | — | 569 | ◉ | O | X |
| Comparative Example 5 | — | — | 394 | — | — | — | 10 | — | 39 | 42 | — | 515 | ◉ | O | X |
| Comparative Example 6 | — | — | 394 | — | — | — | 10 | — | 52 | 56 | — | 488 | ◉ | O | Δ |

What is claimed is:

1. An aqueous coating composition for formation of a coating film having high corrosion-resistance on a metal substrate which comprises (a) a film-forming polymeric material having at least one hydroxyl group and/or at least one carboxyl group, (b) a zwitter-ion compound and (c) an aminoplast resin and/or an epoxy resin, wherein said zwitter-ion compound (b) is a hydroxyl group-containing aminosulfonic acid compound of the formula:

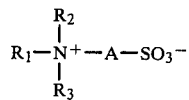

wherein $R_1$ is a $C_1$–$C_{20}$ alkyl group having at least one hydroxyl group, $R_2$ and $R_3$ are each a hydrogen atom or a $C_1$–$C_{20}$ alkyl group having optionally at least one hydroxyl group or, when linked together, they represent a $C_2$–$C_7$ alkylene group having optionally at least one hydroxyl group, or either one of $R_2$ and $R_3$ represents a $C_1$–$C_6$ straight or branched alkyl group having a sulfonic group or a substituted or unsubstituted phenyl group, and A is a straight or branched $C_1$–$C_6$ alkylene group or a substituted or unsubstituted phenylene group.

2. The composition according to claim 9, which comprises further (d) a surface active agent having a hydrophilic functional group and at least one hydroxyl group and/or at least one carboxyl group.

3. The composition according to claim 1 or 2, wherein the film-forming polymeric material (a) is an ethylene-acrylate copolymer.

4. A method for formation of a coating film having high corrosion-resistance on a metal substrate which comprises applying the composition according to claim 1 onto the surface of the metal substrate.

5. The method according to claim 4, wherein the metal substrate is an aluminum substrate.

6. A method for formation of a coating film having high corrosion-resistance on a metal substrate which comprises applying the composition according to claim 2 onto the surface of the metal substrate.

7. The method according to claim 6, wherein the metal substrate is an aluminum substrate.

* * * * *